Patented Apr. 17, 1928.

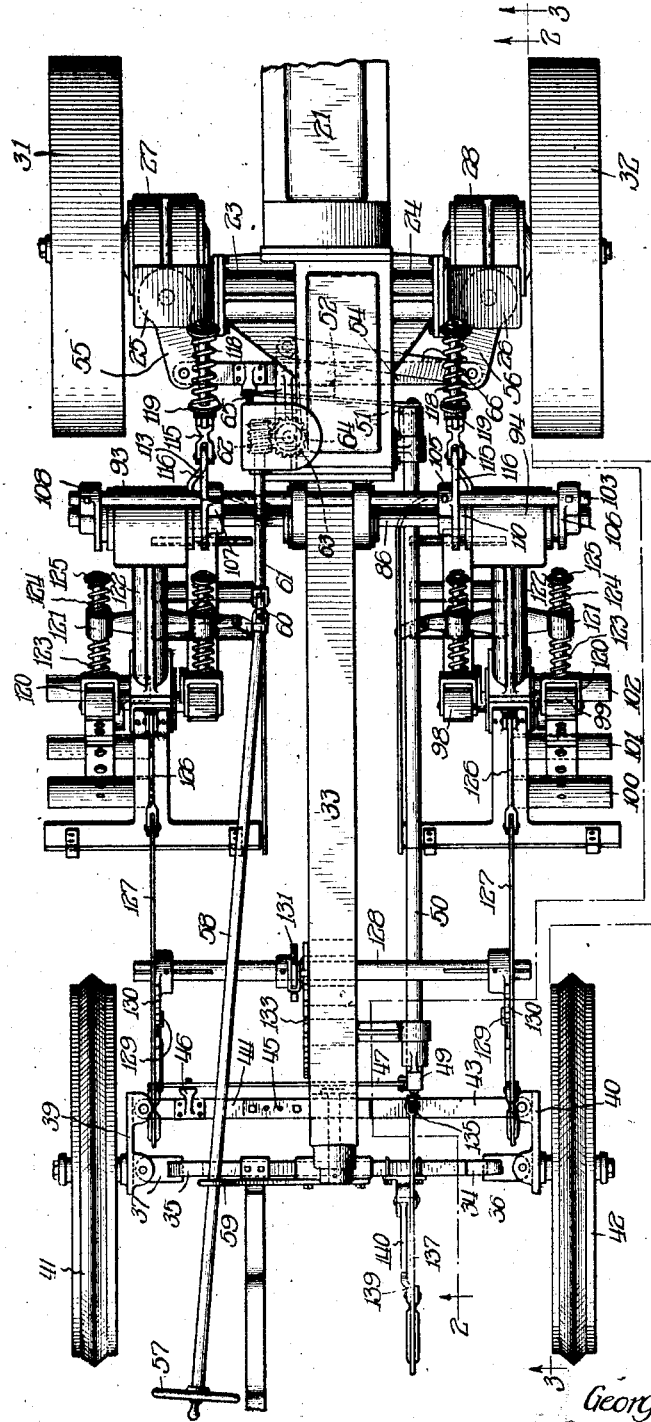

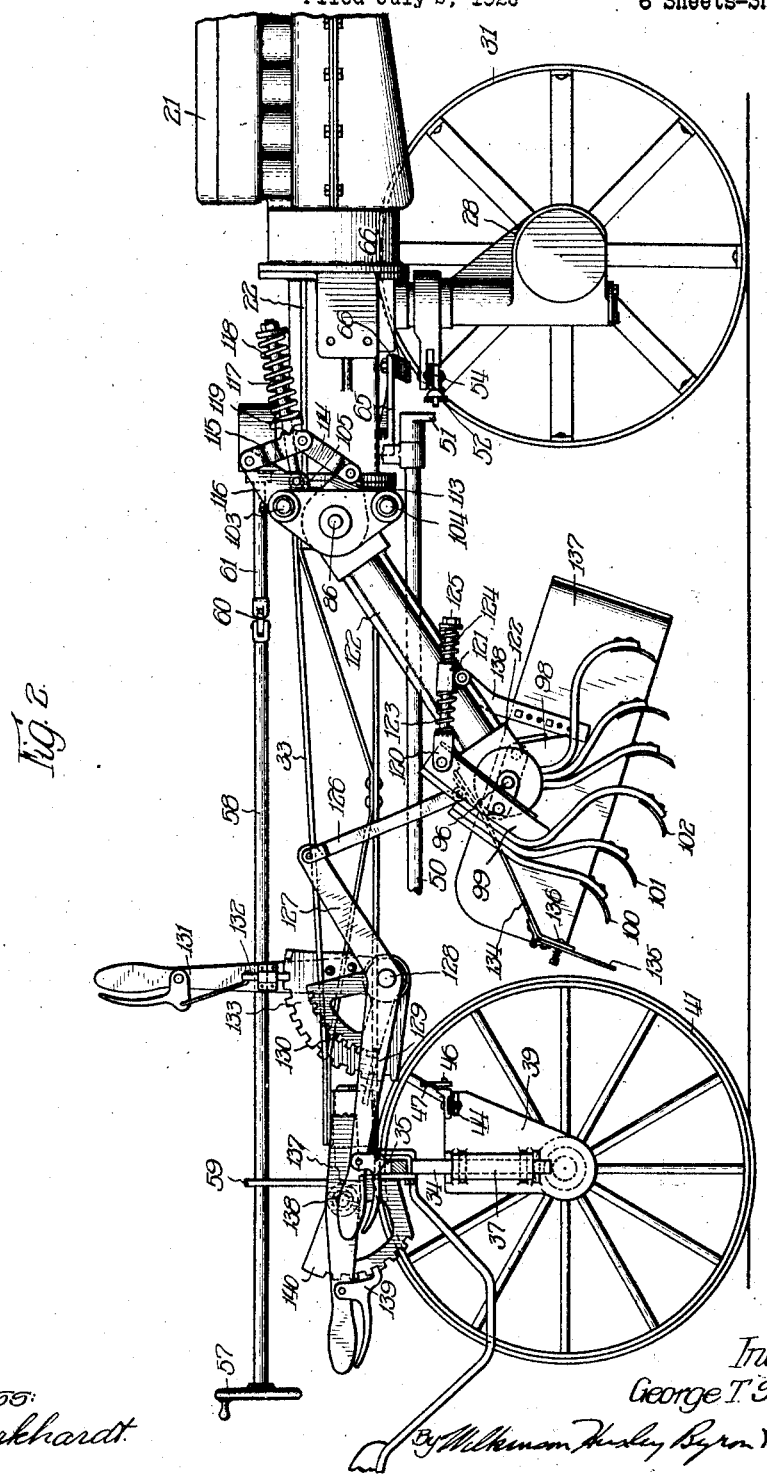

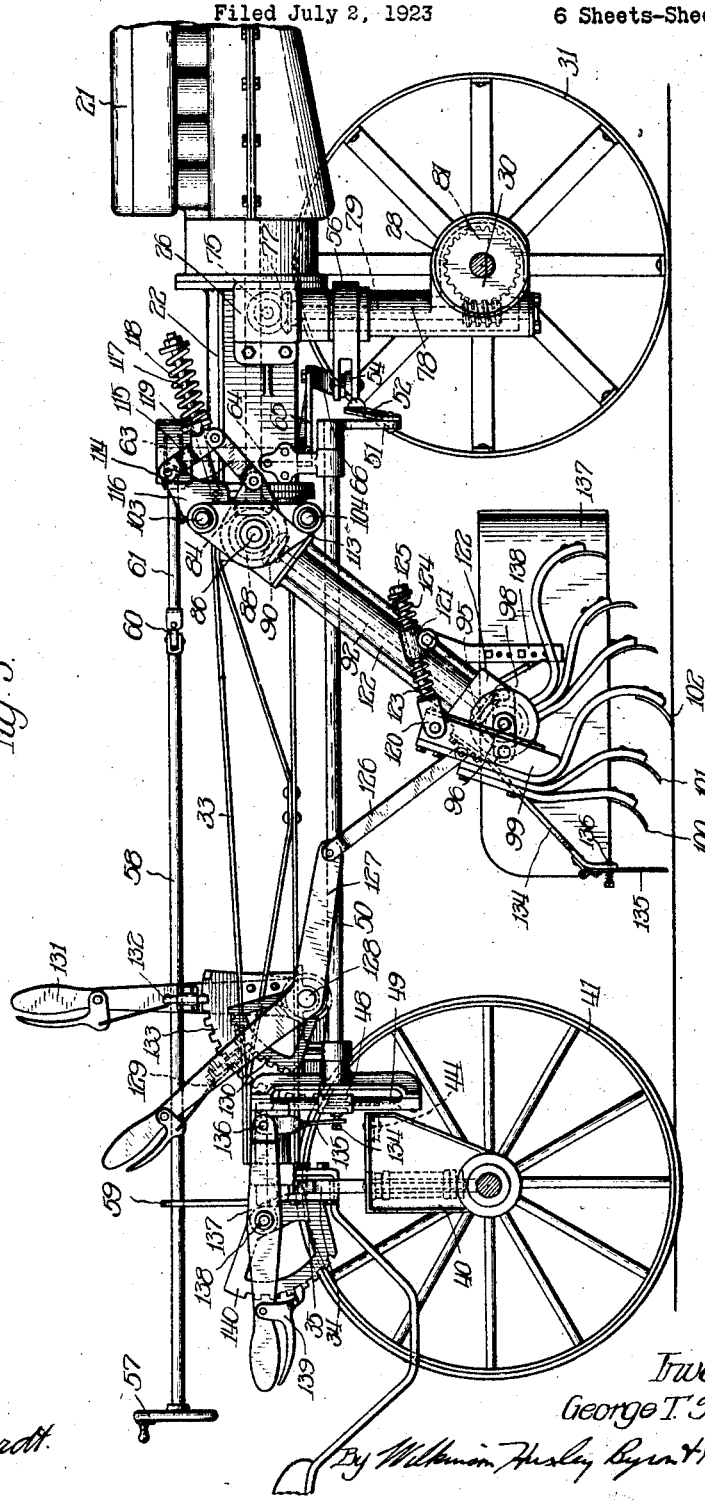

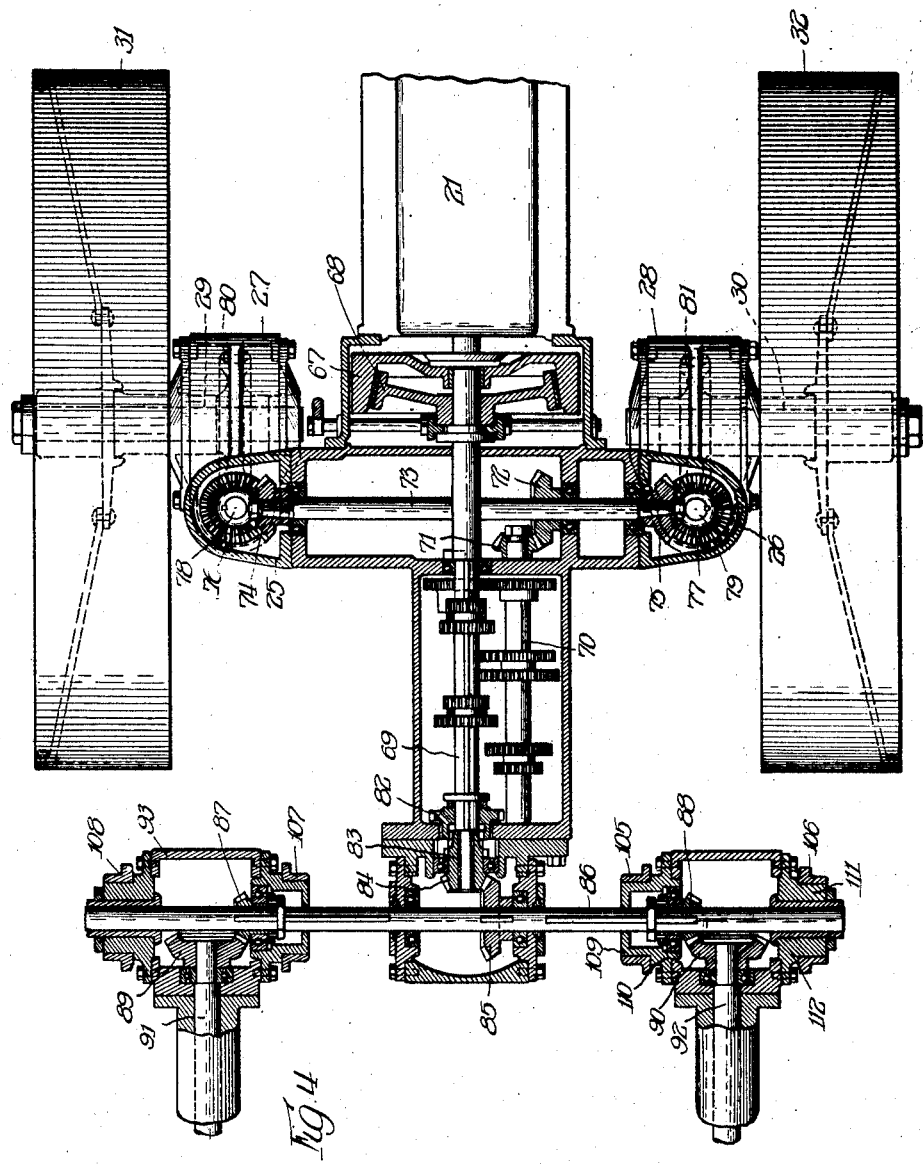

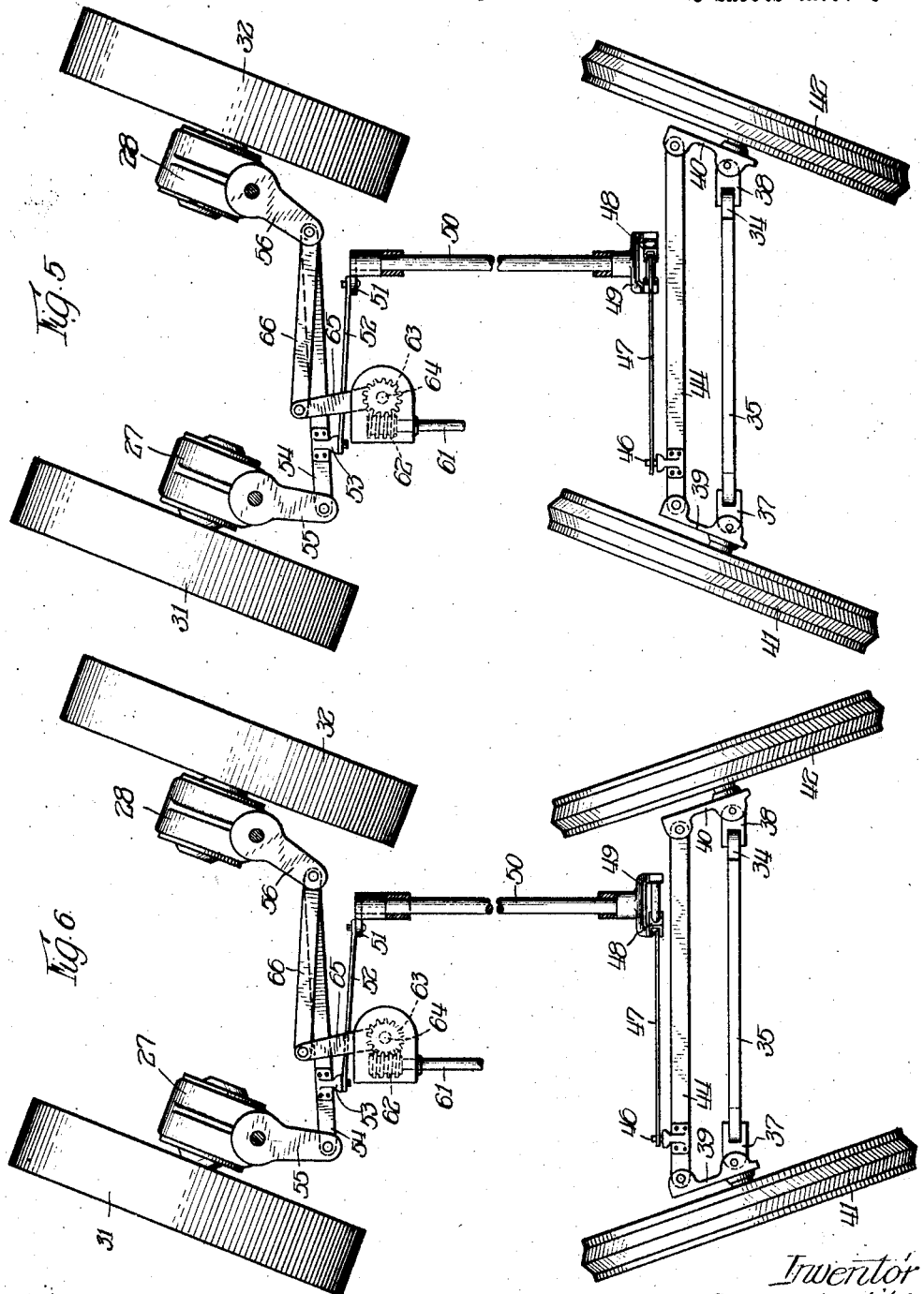

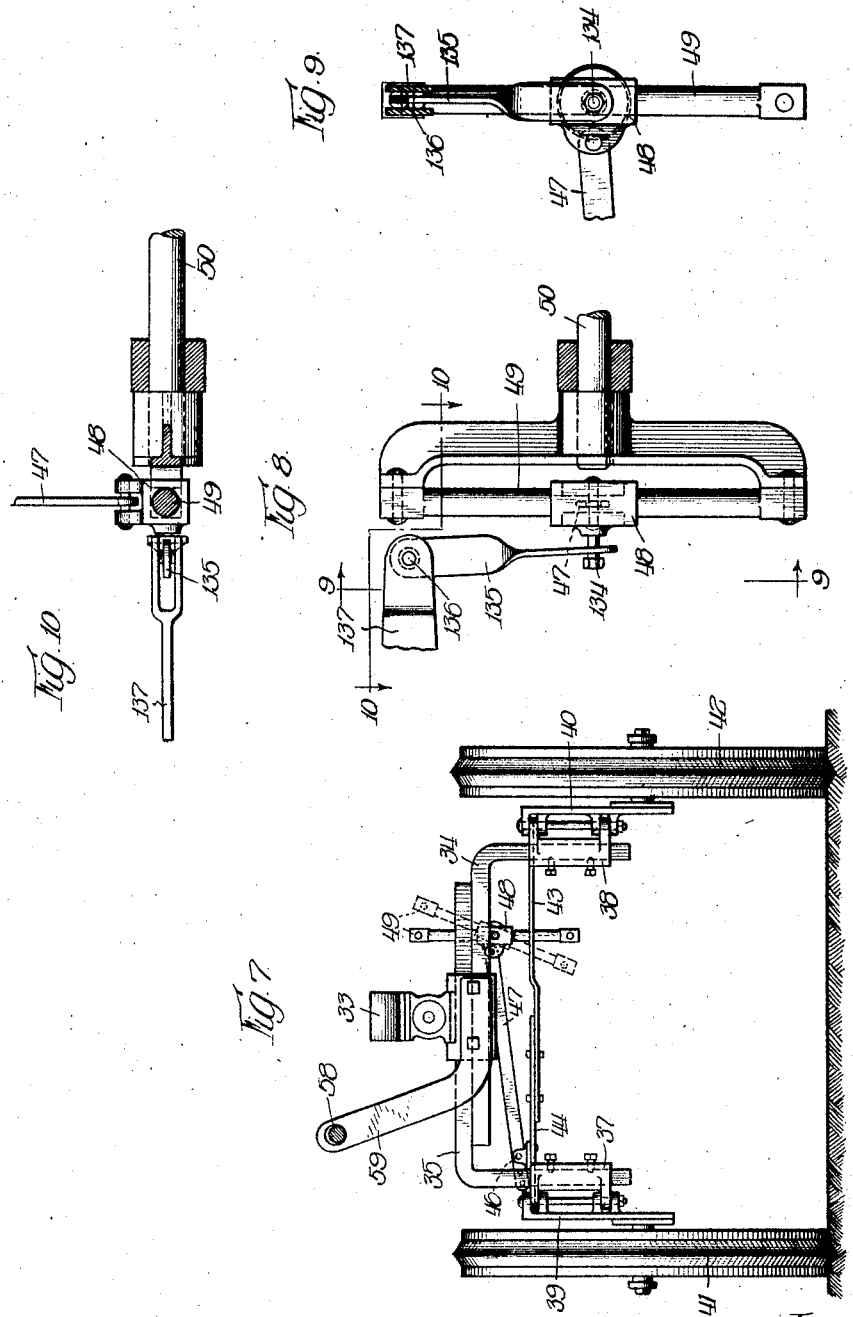

1,666,185

UNITED STATES PATENT OFFICE.

GEORGE T. STRITE, OF PORT WASHINGTON, WISCONSIN, ASSIGNOR OF TWO-THIRDS TO HARRY W. BOLENS, OF PORT WASHINGTON, WISCONSIN.

GARDEN TRACTOR.

Application filed July 2, 1923. Serial No. 648,921.

This invention relates to a new and improved agricultural tractor and more particularly to a construction of this kind provided with means for steering both front and rear wheels and provided with power operated implements.

It is an essential feature of apparatus of this character that it be able to make turns upon a very small radius since the turning space at the end of rows of plants is often very limited. It is essential that the machine be provided with adequate clearances so as to be able to cultivate the plants when they have attained considerable growth.

In cultivating upon a side hill with a machine of this character, there is a tendency for the rear wheels to slip down hill upon the comparatively soft soil. This slip may be sufficiently serious to cause material damage to the row of plants being cultivated. It is, therefore, important to provide means whereby the rear end can be steered so as to counteract such slippage.

It has been found that cultivators which merely operate upon the ground by the forward movement of the vehicle do not provide an adequate mulching of the soil. It is, therefore, important to provide power actuated implements which operate at a greater speed than that of the vehicle and which cause each portion of soil to be repeatedly acted upon.

It is important that the implements be capable of being raised and lowered not only in order to vary the action, but also to provide clearance when the apparatus is moving upon roads.

It is an object of the present invention to provide a new and improved agricultural tractor provided with power operated implements and further provided with means for steering both front and rear wheels.

It is a further object to provide a tractor of this character in which the implements may be raised and lowered relative to the vehicle.

It is an additional object to provide means whereby the rear wheels may be selectively steered simultaneously with the front wheels and whereby the direction and amount of movement of the rear wheels may be controlled.

Other and further objects will appear as the description proceeds.

I have illustrated a certain preferred embodiment of my invention in the accompanying drawings, in which:

Figure 1 is a plan view of the tractor;

Figure 2 is an elevation of the tractor partly in section taken on line 2—2 of Figure 1 with the hoes raised;

Figure 3 is a view similar to Figure 2, but taken on line 3—3 and showing the hoes in the lower position;

Figure 4 is a view upon an enlarged scale showing partly in section the tractor and hoe drive gearing;

Figure 5 is a fragmentary plan view showing the steering mechanism with the front and rear wheels guided in the same direction; and Figure 6 is a view similar to Figure 5 but showing the wheels guided in the opposite direction;

Figure 7 is an elevation showing the rear steering mechanism;

Figure 8 is a fragmentary view on an enlarged scale showing the rear steering yoke;

Figure 9 is a section taken on line 9—9 of Figure 8; and

Figure 10 is a section taken on line 10—10 of Figure 8.

The tractor comprises the engine 21 which is rigidly connected to the gear case 22. The gear case is provided with the horizontal protecting portions 23 and 24 to which are connected the bevel gear housings 25 and 26. The wheel-drive housings 27 and 28 extend downwardly from the housings 25 and 26, respectively. These housings 27 and 28 carry the front wheel axles 29 and 30 upon which are the wheels 31 and 32.

The rear end of the gear case 22 is connected to the longitudinal truss 33 and the rear end of this truss is secured to the rear frame members 34 and 35 by means of clamps. The members 34 and 35 carry the vertically extending members 36 and 37 which latter have pivoted thereto the yokes 39 and 40. These yokes carry the rear axles supporting the rear wheels 41 and 42. The yokes 39 and 40 are connected by the cross tie members 43 and 44 which latter are adjustably connected as shown at 45.

The member 44 carries the lug 46 which engages the operating link 47. As best shown in Figures 8 to 10, this link 47 is connected to a slide 48 carried by yoke 49. The yoke 49 is carried upon the rear end of the shaft 50. The slide 48, carried by yoke 49, is provided with stud 134 upon which is loosely fitted the lower end of the link 135. The upper end of the link 135 is fitted upon a pin 136 carried by the bifurcated end of lever 137. Both these connections are adapted to permit considerable play. The lever 137 is pivoted at 138 and is provided with the lock 139 co-operating with the toothed rack 140, as shown in Figure 2.

As best shown in Figures 5 and 6, the forward end of the shaft 50 is provided with the arm 51 which is connected to link 52, the opposite end of which engages lug 53. Lug 53 is carried by the connecting member 54 which connects the steering knuckles 55 and 56 of the front wheels.

The steering wheel 57 is carried by shaft 58, the rear portion of which is supported in bearing 59. The shaft 58 is connected by the universal joint 60 with the shaft section 61, which latter carries the worm 62 meshing with the gear 63. The gear 63 is carried on the vertical shaft 64, the lower end of which carries the steering arm 65. The steering arm 65 is connected by link 66 to the steering knuckle 56 of the right front wheel.

Referring now to Figure 4, the engine fly wheel 67 is selectively connected to the gear shaft assembly by means of the cone clutch 68. The sliding gear transmission 69 is of usual construction and need not be described in detail. The counter shaft 70 carries the bevel-gear 71 which meshes with bevel-gear 72, the latter being keyed to the transverse shaft 73. This shaft 73 carries upon either end the bevel-gears 74 and 75 which gears are contained within housings 25 and 26 and there mesh with similar gears 76 and 77 carried by the vertical shafts 78 and 79. As indicated in broken lines in Figure 3, the vertical shafts 78 and 79 carry worm gears upon their lower ends which mesh with gears 80 and 81 carried by the front wheel axles.

Referring again to Figure 4, the main drive shaft of the gear transmission is provided with the gear 82 having internal teeth adapted selectively to engage teeth upon the member 83. This member 83 is provided with the bevel-gear 84 meshing with the bevel-gear 85 carried by the transverse shaft 86. The bevel-gears 87 and 88 are slidably carried by the shaft 86, being constrained by keys to rotate with the shaft. This slidable connection permits the implement and power drive assemblies to be adjusted laterally of the vehicle. These gears 87 and 88 mesh with gears 89 and 90 carried by the hoe drive shafts 91 and 92. The hoe driving bevel-gear connections at each side of the shaft 86 are enclosed in housings 93 and 94, respectively.

The lower ends of the shafts 91 and 92 carry bevel-gears as indicated in broken lines in Figure 3 which shows gear 95 carried by shaft 91. This gear meshes with a similar gear carried by short transverse shaft 96 which is provided upon its opposite ends with crank arms 97 and 98, respectively. Each arm carries a hoe supporting member 99 carrying three hoes 100, 101 and 102. The rod 120 is pivotally connected at one end to the hoe-carrying member 99 as best shown in Figure 2. This rod 120 passes through the carrier member 121 which latter is pivotally supported upon the housing 122 which encloses the shaft 92. A spring 123 is fitted upon the rod 120 between the member 121 and the hoe-carrying member 99. A second spring 124 is fitted upon the outer end of the rod and is retained in place by a nut 125 together with a washer. It will be understood that the arrangement at the lower end of shaft 91 is similar to that just described.

The transverse supporting members 103 and 104 are carried by the central frame and extend parallel with and adjacent to the shaft 86. The members 105 and 106 shown in Figure 4 are carried upon one end of these transverse members and similar members 107 and 108 are carried upon the opposite end of the members.

The member 105 is provided with an opening concentric with the shaft 86 and in this opening receives a trunnion portion 109 formed on the end piece 110 of the housing 94. The member 106 is provided with an opening which receives a trunnion portion 111 of the outer end plate 112 of the housing 94. The construction upon the opposite end of the transverse member is exactly similar.

The member 110 is provided with the ear 113 shown in Figures 1 and 3 to which is connected the link 114. This link 114 is pivotally connected at its free end to the link 115, the upper end of which is pivotally connected to the ear 116 which is formed integrally with the member 105. The rod 117 has one end pivotally connected to the member 105 and its free end carries a washer and nut which retain the spring 118 in place upon the member. The pivot member 119 is carried by the member 117 and is urged by the spring 118 into engagement with a seat formed on the link 115.

The link 126 connects the housing 122 with the end of the bell crank lever 127. This lever 127 is pivoted upon shaft 128 and is provided with a sliding lock 129 which co-operates with a toothed sector 130 fixedly secured to shaft 128. As shown in Figure 1, the opposite side of the machine is similarly equipped. The lever 131 is keyed to the shaft 128 and is provided with the lock member 132 which co-operates with a toothed rack 133 which latter is fixedly secured to the vehicle frame 33.

The bar 134 secured to housing 122 carries the plate 135 hinged thereto. The bolt 136 secured to bar 134 passes through plate 135 and a spring surrounds the bolt and bears against the plate to yieldingly resist swinging movement of the plate. The longitudinal guard plate 137 is hung from housing 122 by hanger 138. While one side of the machine has been described, it is to be understood that both sides are identical in construction.

In the operation of the steering mechanism, the front wheels are steered by rotating the hand wheel 57. This motion is transmitted through shafts 58 and 61 and through the vertical shaft 64 to the arm 65 and link 66. Through the connection established by the lug 53, link 52 and arm 51, the shaft 50 is rotated upon steering movement of the forward wheels. When the slide 48 is located in line with the axis of the shaft 50 substantially no movement is imparted to link 47 by rotation of the shaft. If the slide 48 is raised by swinging downwardly the rear end of the lever 137, movement of the front wheels as shown in Figure 5 will cause the shaft 50 to be rotated in such manner as to draw the slide 48 to the right and consequently this movement through the link 47 and stud 46 swings the rear wheels in the same direction as the front wheels. The movement of the rear wheels is governed in amount by the distance which the slide 48 is raised above its neutral position.

If the slide 48 is lowered by means of lever 137, the rear wheels are swung in the opposite direction to the front wheels as shown in Figure 6. The considerable play allowed at the joint 136 between link 135 and lever 137 and the play between the link 135 and stud 134 permit this movement without strain on these parts.

The hoes 100, 101 and 102 are driven by means of the crank shaft 96 which latter is driven by means of the shaft 92 and cross shaft 86 with their cooperating gears. This drive is governed by moving the gear 82 into or out of mesh with the gear 83. The rod 123 and its springs which cooperate with the sleeves 121 restrain the movement of the upper end of the hoe carrying member 99. They cause the hoes to have an approximately elliptical movement. The springs 124 are also adapted to yield when the hoes strike a relatively hard or immovable substance and will thus prevent damage to the hoes or to the vehicle structure. The springs 123 cushion rebound after such yielding.

The hoes are swung upwardly out of engagement with the ground or are adjusted to vary the depth of cut by means of the levers 127 and 131. The lever 131 serves to move the hoes upon both sides of the machine since this lever is keyed to the shaft 128 and the side levers 127 are constrained to move with the shaft by means of their connection to the shaft through the lug 129 and sector 130 which lug is keyed to the shaft.

The hoes upon either side of the machine may be controlled independently of those upon the other side by means of the corresponding lever 127. Each lever 127 rotates about shaft 128 which remains stationary as do the sectors 130 in this method of operation.

In raising or lowering the hoes, the shaft 92 and the entire hoe assembly rotates about the shaft 86. The trunnions 109 and 111 of the housing members rotate in the fixed members 105 and 106, the latter members being held against rotation by their support upon shafts 103 and 104. The upward movement of the hoes is assisted by the spring 118 which thrusts member 119 against link 115 and urges that link inwardly. The upper pivot point of the link 115 is fixed and movement of the link inwardly thrusts downwardly upon link 114 which link is connected to ear 113 carried by the moving housing. Similarly, when the hoes are lowered, the movement is eased by the resistance of the spring 118 which is compressed by the movement of the links.

As the hoes are raised the two links approach a straight line and although the spring is expanded its leverage is gradually increased and consequently the effective resulting force is substantially constant. In lowering the hoes the spring leverage is decreased as the spring is compressed. The force in either direction is so proportioned that the movement is accomplished by the application of but small force and the hoes tend to remain in adjusted position.

It will be understood that where the operation of one side of the machine has been described in connection with the hoe assemblies that the operation of the other side is identical.

I claim:

1. In a vehicle having front and rear wheels, means of ordinary type for steering certain of the wheels, and supplemental means connecting the steered wheels and other wheels, said means comprising a shaft adapted to be rotated by steering movement of the steered wheels, a yoke rotated by said shaft, a slide on said yoke and means for moving the slide and connecting it to the other wheels whereby the other wheels may be selectively caused to steer with, or opposite to the steered wheels or to remain unaffected by steering movement of the steered wheels.

2. In a four-wheeled vehicle, said wheels being pivotally supported, and a steering knuckle associated with each wheel, a tie member connecting the steering knuckles of the front wheels, a similar member connecting the steering knuckles of the rear wheels, means for actuating the front tie member to steer the front wheels, and means connecting the front tie member to the rear tie member, said means comprising a shaft adapted to be rotated by movement of the front wheels, a yoke carried by the shaft and a shiftable member carried by the yoke, said shiftable member being connected to the rear wheels in such manner that rotation of the shiftable member about the axis of the shaft causes movement of the rear wheels proportional to the radius of rotation.

3. In a four-wheeled vehicle, said wheels being pivotally supported, and a steering knuckle associated with each wheel, a tie member connecting the steering knuckles of the front wheels, a similar member connecting the steering knuckles of the rear wheels, means for actuating the front tie member to steer the front wheels, and means connecting the front tie member to the rear tie member, said means comprising a shaft adapted to be rotated by movement of the front wheels, a yoke carried by the shaft and a shiftable member carried by the yoke, said shiftable member being connected to the rear wheels in such manner that rotation of the shiftable member about the axis of the shaft causes movement of the rear wheels proportional to the radius of rotation, the direction of said movement depending upon the direction in which the shiftable member is moved along the yoke from the axis of the shaft.

Signed at Port Washington, Wisconsin, this 3rd day of May, 1923.

GEORGE T. STRITE.